(12) United States Patent
Simpson

(10) Patent No.: US 6,901,978 B2
(45) Date of Patent: Jun. 7, 2005

(54) APPARATUS AND METHOD FOR CUTTING TREES

(75) Inventor: Randy Simpson, Norfolk, NE (US)

(73) Assignee: ATV-X, Inc., Englewood, CO (US)

( * ) Notice: Subject to any disclaimer, the term of this patent is extended or adjusted under 35 U.S.C. 154(b) by 87 days.

(21) Appl. No.: 10/389,612

(22) Filed: Mar. 17, 2003

(65) Prior Publication Data

US 2004/0182478 A1 Sep. 23, 2004

(51) Int. Cl.[7] .......................... A01G 23/087; B27M 1/08
(52) U.S. Cl. ..................... 144/339; 144/341; 144/367; 144/4.1; 144/34.5
(58) Field of Search ................. 144/4.1, 34.1, 144/34.5, 24.12, 218, 336, 339, 341, 363, 367; 83/862, 863, 865; 56/255, 295; 37/302

(56) References Cited

U.S. PATENT DOCUMENTS

| | | | |
|---|---|---|---|
| 2,512,665 A | | 6/1950 | Meske |
| 2,529,934 A | | 11/1950 | Gracey et al. |
| 2,619,129 A | | 11/1952 | Hines |
| 3,635,269 A | | 1/1972 | Price |
| 4,019,308 A | * | 4/1977 | Quick ........................ 56/13.9 |
| 4,050,488 A | | 9/1977 | Albright |
| 4,407,343 A | | 10/1983 | Brown |
| 4,467,849 A | * | 8/1984 | Denis ........................ 144/34.1 |
| 4,850,409 A | * | 7/1989 | Roberson ..................... 144/336 |
| 4,998,573 A | * | 3/1991 | York ........................... 144/34.1 |
| 5,048,579 A | * | 9/1991 | Lloyd ........................ 144/24.12 |
| 5,101,873 A | | 4/1992 | Marshall |
| 5,479,971 A | | 1/1996 | Marshal |
| 5,950,699 A | | 9/1999 | Dove |
| 6,453,957 B1 | * | 9/2002 | Devaney .................... 144/34.1 |

* cited by examiner

Primary Examiner—Derris H. Banks
Assistant Examiner—Shelley Self
(74) Attorney, Agent, or Firm—Patrick J. Glynn

(57) ABSTRACT

A tree cutter in combination with a self-propelled vehicle is disclosed for cutting underbrush and small free standing trees, such as, Cedar. The tree cutter is pivotally mounted at the front of the self-propelled vehicle, such as, a Four Wheeler in order to pivot upon a horizontal axis. The tree cutter provides a frame assembly that includes a discrete pair of triangular straight edge blades followed by a pair of circular blades that rotate in opposite directions caused by contact with the inner core the tree. The blade pairs are adjacent, oppositely disposed, and selectivly spaced apart as included in the frame assembly.

The blade pairs act in synergy as they are driven into the tree by the vehicle, wherein the straight blades are suited for slicing into the soft outer vascular core of the tree, thereafter shearing force of the rotating blades is applied to the harder sapwood and heartwood that are engaged between the rotating blades.

14 Claims, 6 Drawing Sheets

APPARATUS AND METHOD FOR CUTTING TREES

BACKGROUND OF THE INVENTION

The present invention relates to clearing land of trees efficiently, especially small trees with a thickness of up to seven inches in diameter, such as Cedar, without the use of expensive self-propelled machinery, such as tractors, bulldozers and the like. It is therefore an object of the invention to provide an effective, yet relatively inexpensive cutting tool that can be easily mounted and dismounted from a small self-propelled vehicle, such as, a Four Wheeler creating a dual purpose vehicle. Among the several objects of the invention, therefore, is to eliminate the need for using heavy equipment that has more capacity than needed for the job. It is a further object of the invention to provide a system of replaceable smooth flat blades that are task specific for cutting the softer outer core and the harder inner core of a tree, providing an efficient means for cutting.

SUMMARY OF THE INVENTION

According to the invention, two pairs of blades each pair being oppositely disposed are mounted within the interior of a fork-like frame assembly that is pivotally attached to the bottom frame of a self-propelled vehicle preferably a Four Wheeler by means of a tube assembly. The frame assembly is positioned in front of the Four Wheeler and suspended by a cable attached to the top of the frame assembly at one end and, at the other end, wound upon a self-propelled winch that is standard equipment on many Four Wheelers. By adjusting the length of the cable the tree cutter is allowed to pivot against the frame of the vehicle so that the frame assembly can be lowered nearer to the ground for cutting smaller trees and underbrush and raised to cut larger freestanding trees.

A first pair of anterior straight edge blades are provided for slicing the outer core of the tree, driven by the forward motion of the self-propelled vehicle. They are followed by a pair of circular blades that rotate freely in counter-rotation to each other upon contact with the inner core as the vehicle continues its forward motion against the tree. The rotational blades are spaced closer together than the straight edge blades in order to pinch the remaining inner core by their simultaneous counter-rotational motion. Thus, the cutting pressure applied by the rotational blades is greater and more suited for cutting the denser, harder sapwood and heartwood of the inner tree core. This is because the cutting edge of the rotational blades are driven into the tree wood as they rotate, cutting by shearing force rather than by slicing as performed by the first pair of straight edge blades.

Optionally, a single additional straight edge blade is laterally mounted behind the pair of rotational blades at the extreme interior of the frame to clear any remaining debris after the inner core of the tree has been cut. All blades are removable for maintenance and replacement. In addition, the space between the rotational blades is adjustable to achieve optimum cutting efficacy and to account for blade wear and variations in tree thickness.

DETAILED DESCRIPTION OF THE PREFERRED EMBODIMENT OF THE INVENTION

Figure 1:
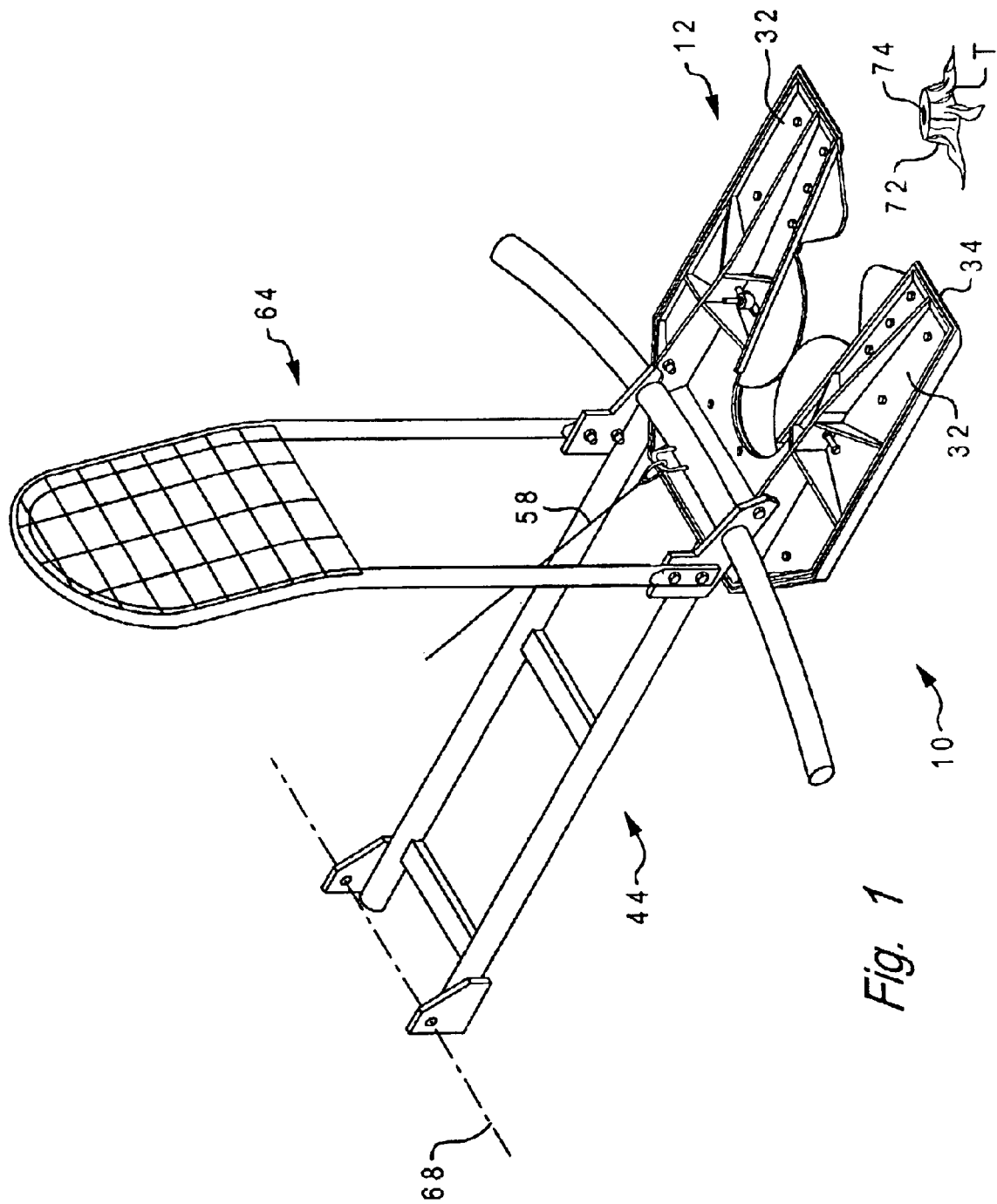
FIG. 1 is a perspective view of the tree cutter of the invention.
Figure 2:
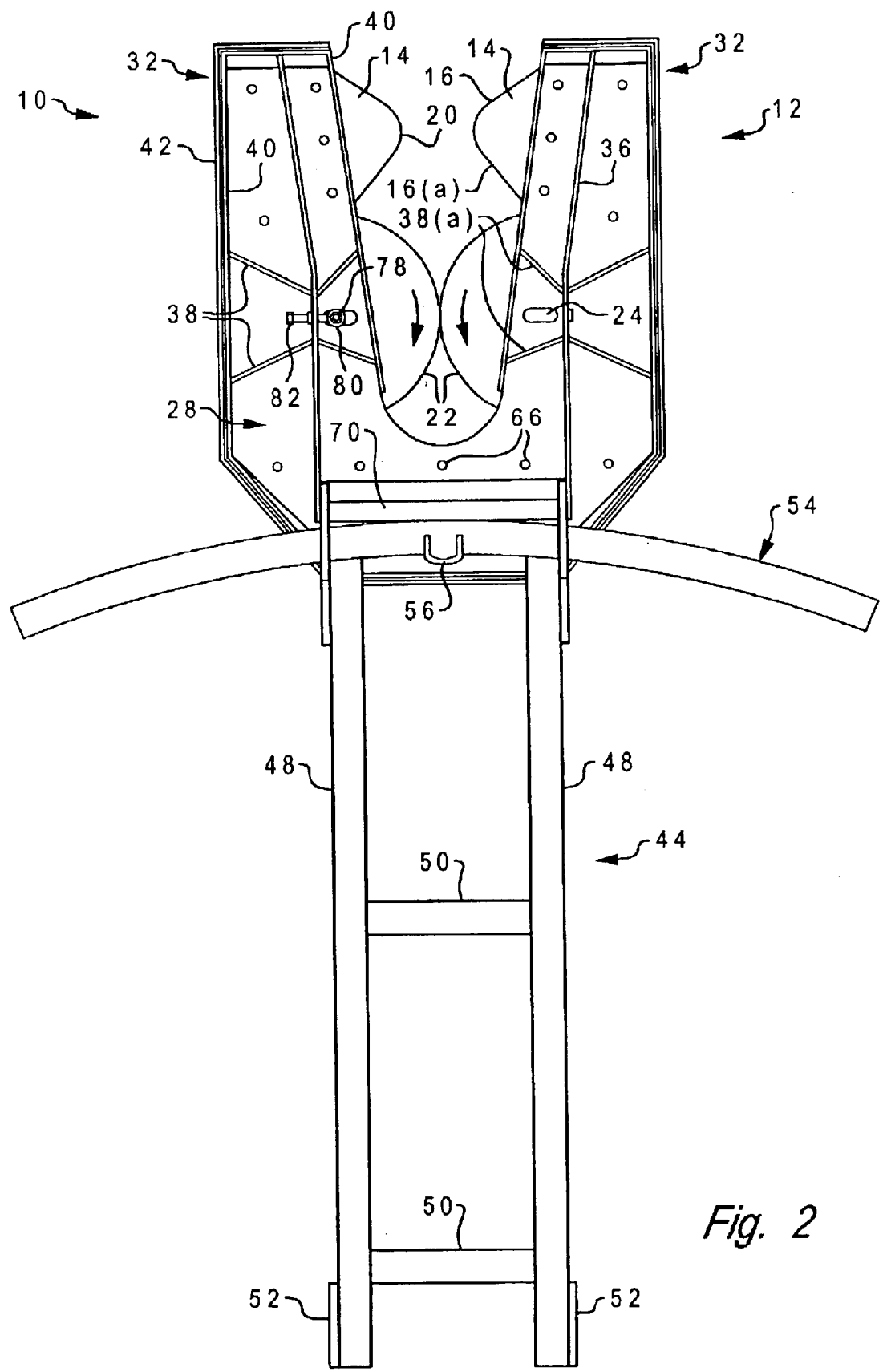
FIG. 2 is a top elevational view of the preferred tree cutter.

Referring to FIGS. 1 and 2 a tree cutter 10 includes a fork-shaped frame assembly 12 including two identical forward diverging frame members 32. A tube assembly 44 attaches frame assembly 12 to the frame of a self-propelled vehicle and pivots upon axis 68. The frame assembly can be raised or lowered by cable 58 attached at one end to frame assembly 12 at grommet 56, the other end being wound upon a winch mounted to the self-propelled vehicle. Forward diverging members 32 form the interior of the frame 12 which includes a first pair of straight edge blades 14 that are stationary and spaced apart opposite each other. Oppositely slanted cutting edges 16 and 16a provide for cutting by the forward and backward movement of the self-propelled vehicle. Thus, after edge 16 initially engages the tree T, cutting can also be performed by the backward motion of the vehicle, engaging cutting edge 16a slanted toward the interior of the frame 12. The backward cutting avoids uprooting tree T causing messy debris according to the prior art methods if edge 16 is initially snagged. Preferably, edges 16 and 16a are connected by arcuate edge 20. A second pair of oppositely disposed circular blades 22 are mounted to frame 12 behind blades 14 so that they can rotate freely in opposite directions when contact is made with tree T. No power is applied to blades 22, as according to the prior art, except the force provided by the motion of the self-propelled vehicle causing the frictional engagement of blades 22 with tree T. As illustrated in FIG. 2, blades 22 are spaced closer together than blades 14 for engaging the inner core 74 of tree T.

Figure 3:
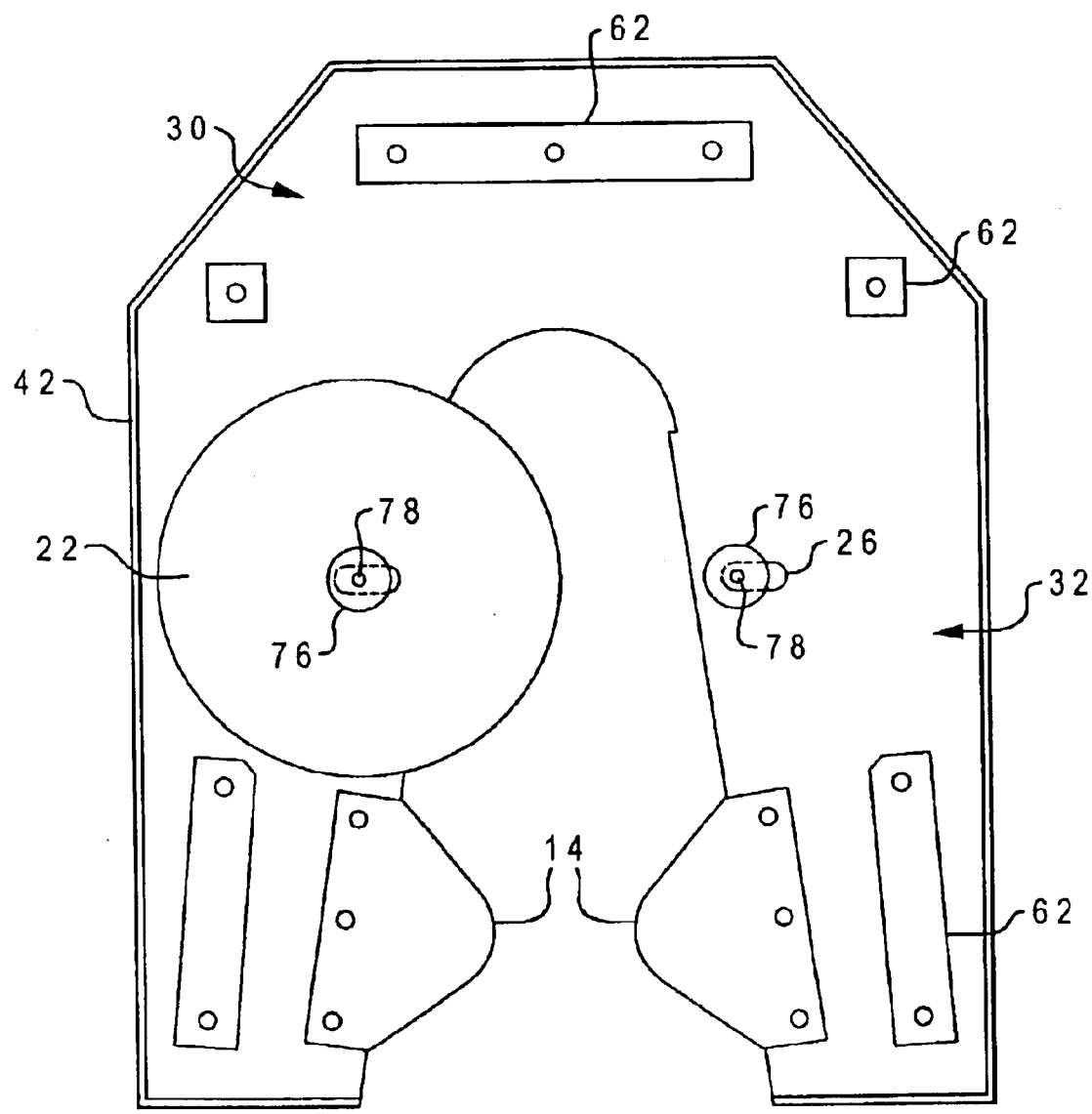
FIG. 3 is a top elevational view of the bottom plate of the tree cutter frame assembly.

Fame assembly 12 includes a bottom plate 30 (FIG. 3) that is overlaid by a top plate 28. The plates are held together by carriage bolts extending from underneath the bottom plate 30 through pre-drilled holes 66 in both plates and secured by hexagonal nuts positioned at the top plate 28. Blade pairs 14 and 22 are connected to the frame assembly 12 inside a housing formed between the top and bottom plates. FIG. 3 shows the interior surface of bottom plate 30 with blade pairs 14 and 22 attached before overlaid by the top plate 28. Spacers 62 provide the proper space between the top plate 28 and bottom plate 30 so that blades 22 can freely rotate in the housing between the plates. Circular blades 22 rotate freely on bushing 76 that is sandwiched between the top and bottom plates and will not move during operation, being compressed by the assembly of plates 30 and 28. However, the circular blades are dimensioned so they can rotate. Accordingly, circular blades 22 include a centered hole that is 1¼ inches in diameter into which bushing 76 is inserted. Because bushing 76 has an outside diameter of 1 and 1/16 inches, there is a preferable 3/16 inch clearance for each blade 22 to rotate on bushing 76.

Figure 4:
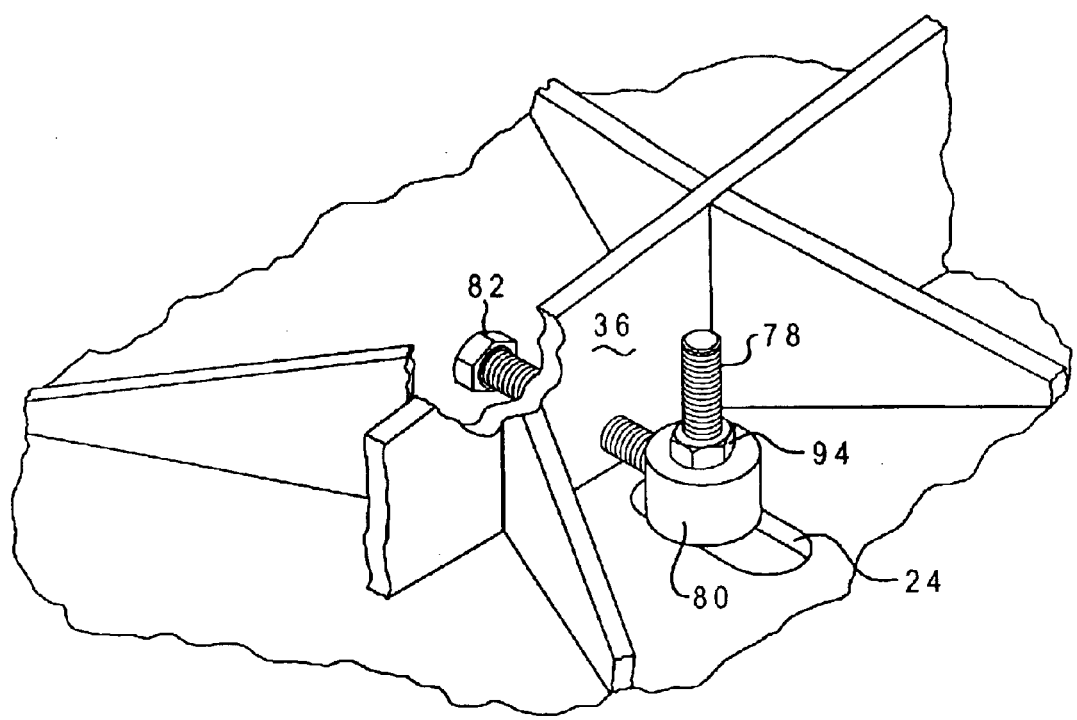
FIG. 4 is a perspective view of the circular blade adjustment means.

Each blade 22 is secured by carriage bolt 78 that begins underneath bottom plate 30 at slot 26 and extends through the center of bushing 76 and through identical slot 24 of top plate 28 shown in FIGS. 2 and 3. As illustrated in FIG. 4, carriage bolt 78 is secured by hexagonal nut 94 that sits on bushing 80 atop plate 28. The center of rotation of the circular blades can be changed by turning bolt 82 against bushing 80. This will laterally reposition the carriage bolt 78 through slots 24 and 26 of the top and bottom plates respectively. The net effect is to reposition the circular blades 22 and to enlarge or diminish the space between them. Blades 14 and 22 are preferably made from "D-2" steel having a "Rockwell Hardness" of between 58 and 60.

Figure 7:
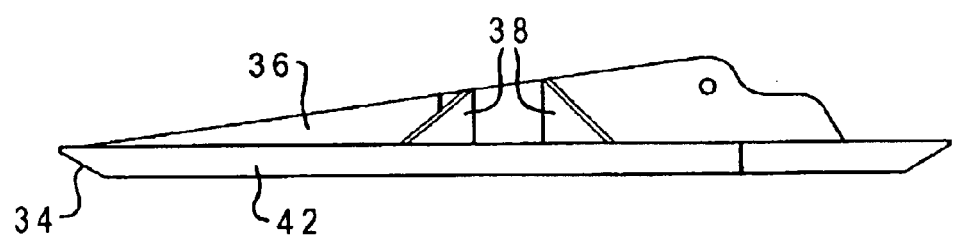
FIG. 7 is a side view of the frame assembly.

To provide for structural integrity of frame assembly 12, bottom plate 30 includes a peripheral lip 42 (FIG. 3) that does not extend to the interior of the frame assembly 12. This is to allow blade pairs 14 and 22 to protrude from the frame assembly 12 into the space included by the frame assembly 12. Top plate 28 is slightly smaller than bottom plate 30 and includes a peripheral lip 40 that does extend into the interior of the frame assembly 12. When the plates are attached, lip 40 fits inside and snug against lip 42 illustrated in FIG. 2. In order to enhance the structural design of the frame assembly 12, top plate 28 also includes ribs 36, extending the length of frame members 32, lateral rib pairs 38, medial rib pairs 38a and lateral rib 70 illustrated in FIGS. 2 and 7. Forward diverging frame members 32 include tapered ends 34 shown in FIG. 7 so they can function like skids while cutting underbrush and small trees at ground level.

Figure 5:
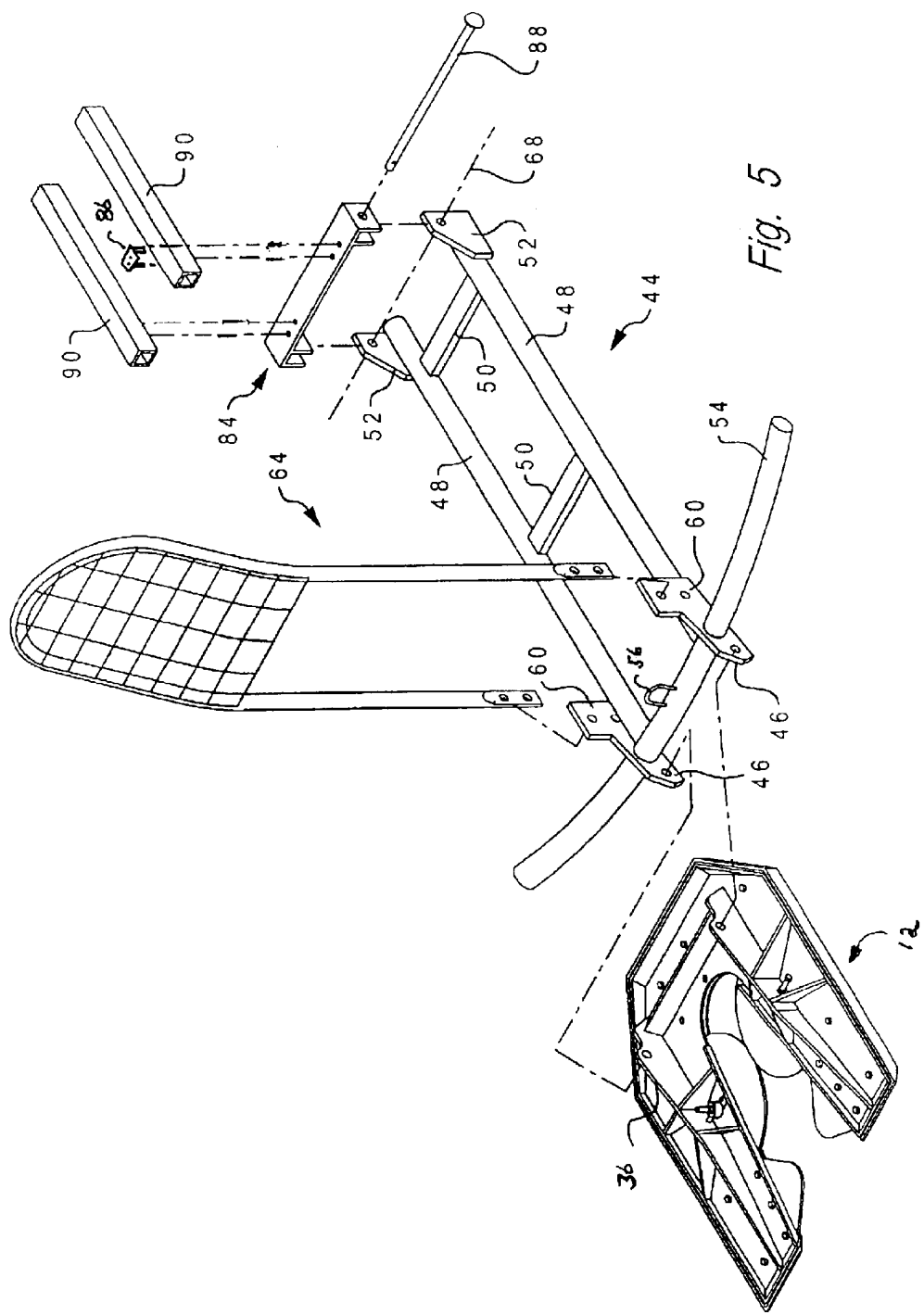
FIG. 5 is a schematic view of the tree cutter assembly.

Referring to FIGS. 2 and 5 tube assembly 44 attaches to the frame of the vehicle allowing the tree cutter 10 to pivot on the horizontal axis 68 and allowing the frame assembly 12 to extend forward of the vehicle during operation. The frame assembly 12 is mounted to the tube assembly 44 by attaching horizontal tabs 46 to the posterior end of ribs 36 as illustrated in FIG. 5. At the opposite end, tube assembly 44 attaches to the vehicle mounting plate assembly 84 by inserting vertical tabs 52 into the stalls under plate assembly 84 and inserting pin 88 thorough holes provided at the stalls and the vertical tabs 52, so that the tree cutter 10 can pivot on horizontal axis 68 as illustrated in FIG. 5. Vehicle frame assembly 84 attaches underneath vehicle frame members 90 by means of bolt assembly 86 as also illustrated in FIG. 5. Tubes 48 extend underneath and forward of the vehicle for attachment of the frame assembly 12. Lateral tubes 50 provide structural support. Included with tube assembly 44 is a tapered bumper guard 54 and grommet 56 for attachment of the suspension cable 58 shown in FIG. 1. A safety guard 64 is provided for the vehicle operator and attaches to vertical tabs 60 illustrated in FIG. 5.

Figure 6:
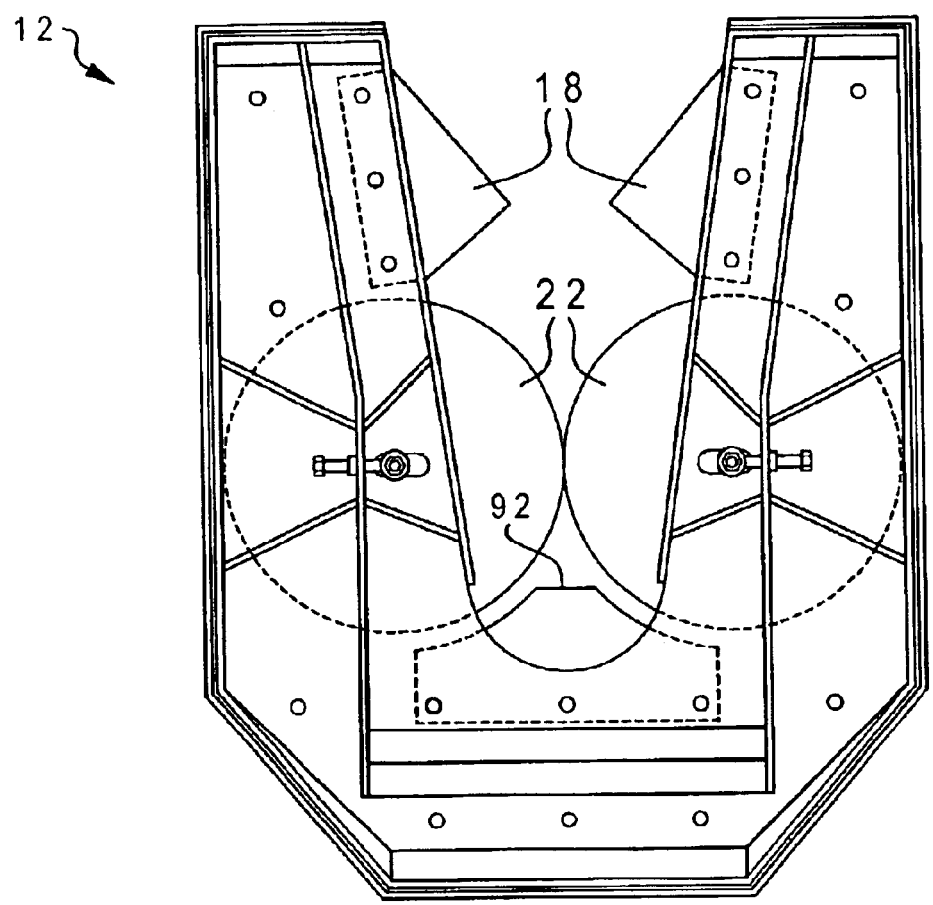
FIG. 6 is a top elevational view of an alternate embodiment of the frame assembly.

FIG. 6 illustrates modification 18 of the first pair of blades to form a triangle and modification of the frame assembly 12 to include a straight edge blade 92 mounted at the extreme interior of frame assembly 12.

In use, tree cutter 10 accounts for the disparate cross-sectional densities of the trunk of tree T. The outer bark (periderm), inner bark (secondary phloem), and vascular cambium is defined herein as the softer outer core of tree T. Contained within the outer core is the inner core of tree T comprised of the denser regions of the sapwood and heartwood where the tree's resin has become hard (Website: Texas Education Agency, (http://levftn.vfm.orglprojects/chalfant/biology.htm). The straight edge blades 14 will first slice into the outer core 72 as the vehicle thrusts into the tree T (FIG. 1), leaving the remaining inner core 74 for cutting by means of the shearing force of the rotational blades 22. Shearing force means the final cut when the inner core is pinched between the simultaneous counter-rotation of blades 22. Straight edge blades 14 are well suited for cutting the softer bark and vascular regions of outer core 72, while rotational blades 22 are more effective in bringing greater cutting pressure to bear upon the denser inner core 74 of tree T. Thus, the straight edge blades 14 and rotational blades 22 act in synergistic relationship rendering remarkably clean cutting.

By raising and lowering the frame assembly 12 by adjusting the length of the suspension cable 58 cutting, ranging from undergrowth and small trees to larger free-standing trees, can be performed in one clearing operation. Moreover the tree cutter 10 can be easily dismounted from the vehicle by disengaging bolts 86 (FIG. 5). The top plate 28 of the frame assembly 12 can be easily removed for cleaning the frame housing and blades 22 and 14.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

I claim:

1. An improved tree cutter in combination with a self-propelled vehicle the improvement comprising: a frame assembly including means for discrete cutting extending from said vehicle wherein said means for discrete cutting includes a pair of straight edge blades that are oppositely disposed and spaced apart and a pair of freely rotating circular blades that are oppositely disposed and spaced apart and rotate oppositely when contact is made with the trunk of a tree, wherein said circular blades and straight edge blades are disposed on the same plane included by said frame assembly.

2. The improved tree cutter as claimed in claim 1 wherein said pair of straight edge blades have oppositely slanted cutting edges that are joined and attached to said frame assembly so that they are stationary and said pair of freely rotating circular blades are adjustably attached to said frame assembly for changing the distance between said circular blades.

3. The improved tree cutter as claimed in claim 1 wherein said frame assembly includes a top plate and a bottom plate forming a frame housing and diverging frame members wherein said pair of freely rotating circular blades and said pair of straight edge blades are mounted to said frame members.

4. The improved tree cutter as claimed in claim 3 wherein the extreme end of each said diverging frame member is tapered upward.

5. The improved tree cutter as claimed in claim 3 wherein said top plate includes at least one longitudinal rib extending at least a portion of the length of said frame member and at least one lateral rib that intersects said longitudinal rib.

6. The improved tree cutter as claimed in claim 1 wherein said frame assembly is combined with said vehicle by means of a tube assembly.

7. The improved tree cutter as claimed in claim 6 including a bumper guard that extends horizontally from said tube assembly for protecting said vehicle.

8. The improved tree cutter as claimed in claim 6 including a protective barrier that extends vertically from said tube assembly for protecting the operator of said vehicle during tree cutting.

9. The improved tree cutter as claimed in claim 1 including means for raising or lowering said frame assembly.

10. The improved tree cutter as claimed in claim 1 wherein said tree cutter is combined to said vehicle by mounting to said vehicle for pivotal movement of said tree cutter about a horizontal axis.

11. The improved tree cutter as claimed in claim 2 wherein said oppositely slanted cutting edges are joined to form the sides of a triangle.

12. The improved tree cutter as claimed in claim 2 wherein said oppositely slanted cutting edges are joined by an arcuate cutting edge.

13. A method of cutting trees, comprising driving a combination of means for discrete cutting positioned on the same plane into the trunk of a tree by means of a self-propelled vehicle for selectively engaging the disparate densities of the light outer core and the hard inner core of said trunk by slicing said outer core by means of a first pair of oppositely disposed straight edge blades, then applying shearing force to said inner core by means of a second pair of oppositely disposed freely rotating circular blades that rotate oppositely caused when contact is made with said inner core.

14. The method of cutting trees as claimed in claim 13 including slicing any inner core remaining after cutting with said freely rotating circular blades by means of a single straight edge blade positioned on the same plane as said circular blades.

* * * * *